US008504568B2

(12) United States Patent
Chandrasekhara et al.

(10) Patent No.: US 8,504,568 B2
(45) Date of Patent: Aug. 6, 2013

(54) COLLABORATIVE WORKBENCH FOR MANAGING DATA FROM HETEROGENEOUS SOURCES

(75) Inventors: Vasu Chandrasekhara, Heidelberg (DE); Andreas Eberhart, Bruchsal (DE); Stefan Kraus, Rauenberg (DE); Ulrich Walther, Wiesloch (DE)

(73) Assignee: Fluid Operations GmbH, Walldorf (DE)

( * ) Notice: Subject to any disclaimer, the term of this patent is extended or adjusted under 35 U.S.C. 154(b) by 678 days.

(21) Appl. No.: 12/350,714

(22) Filed: Jan. 8, 2009

(65) Prior Publication Data

US 2010/0174693 A1    Jul. 8, 2010

(51) Int. Cl.
*G06F 17/30* (2006.01)

(52) U.S. Cl.
USPC .............................. 707/737; 707/711; 707/777

(58) Field of Classification Search
USPC   707/816, 817, 736, 711, 77, 999.01–999.206
See application file for complete search history.

(56) References Cited

U.S. PATENT DOCUMENTS

| 5,583,763 | A | 12/1996 | Atcheson et al. |
| 5,634,124 | A | 5/1997 | Khoyi et al. |
| 6,049,777 | A | 4/2000 | Sheena et al. |
| 6,195,657 | B1 | 2/2001 | Rucker et al. |
| 6,609,132 | B1 * | 8/2003 | White et al. ........................ 1/1 |
| 2005/0262081 | A1 * | 11/2005 | Newman ............................ 707/9 |
| 2006/0287890 | A1 * | 12/2006 | Stead et al. ...................... 705/3 |
| 2007/0174247 | A1 * | 7/2007 | Xu et al. .......................... 707/3 |
| 2007/0299828 | A1 * | 12/2007 | Lewis et al. ...................... 707/3 |
| 2008/0282198 | A1 * | 11/2008 | Brooks et al. ................. 715/854 |
| 2009/0077025 | A1 * | 3/2009 | Brooks et al. .................... 707/3 |
| 2009/0164267 | A1 * | 6/2009 | Banatwala et al. ............... 705/7 |
| 2009/0287674 | A1 * | 11/2009 | Bouillet et al. .................... 707/5 |
| 2009/0326872 | A1 * | 12/2009 | Rubin et al. ...................... 703/1 |

OTHER PUBLICATIONS

"RDFa Primer: Bridging the Human and Data Webs", W3C Working Group Note Oct. 14, 2008, visited Oct. 18, 2008 at http://www.w3.org/TR/2008/NOTE-xhtml-rdfa-primer-20081014/.
Schmidt, et al., "On Enriching Ajax with Semantics: The Web Personalization Use Case", http://www.eswc2007.org/pdf/eswc07-schmidt.pdf.
"XML Linking Language (XLink) Version 1.0", W3C Recommendation Jun. 27, 2001, visited Oct. 18, 2008 at http://www.w3.org/TR/xlink/.

* cited by examiner

*Primary Examiner* — Dennis Truong
(74) *Attorney, Agent, or Firm* — Kenyon & Kenyon, LLP (57) ABSTRACT

Disclosed is an exemplary computer program application, system and method for a unified approach to managing data from heterogeneous sources. The system includes a central, semantic data storage basing on a directed labeled graph model, a module for accessing data sources by drawing access and mapping configuration from the data storage and loading the resulting data into the data storage and a unified user interface that treats each graph node in the data storage as a separate term, visualizes and modified the term's context in the data graph using configurable user interface widgets.

21 Claims, 5 Drawing Sheets

COLLABORATIVE WORKBENCH FOR MANAGING DATA FROM HETEROGENEOUS SOURCES

BACKGROUND

The present invention relates to the field of computer software and internet applications. More specifically, the invention relates to software enabling the integration, annotation, curation and visualization of data retrieved from a heterogeneous set of sources using a collaboratively editable set of documents and data represented in a semantic graph.

Presently, data integration solutions focus on technical mappings of data types and federated access to data sources. What is missing is to treat this process not as a single, one shot step, but rather as an evolving process. In the areas of knowledge and document management, devices known as "wikis" recently emerged as a popular tool to support the process of collectively, creating, discussing, correcting, extending and evolving a set of documents. "Wikis" can be defined as one possibility for having several users edit a set of hyperlinked documents in a collaborative fashion.

What is needed is a solution that brings these paradigms and principles to the world of (semi)-structured data. Terms, relationships and data mappings need to be documented in textual form such that they can be collaboratively used and refined. Users also need to continuously view and monitor the contents of the unified data storage in order to correct import mappings or find new relationships.

DETAILED DESCRIPTION

Embodiments of the present invention disclose a method implemented on a computer comprising a processor, a graphical user interface and a display device, the method for collaboratively modifying data for presentation in a multiple user environment and for storage. The data is imported, by a processor, from a data source into a database. The imported data is analyzed, by a processor, for relationships to existing data in the database. The imported data that may include may text is also classified according to a classification data structure. The imported data and the existing data is annotated based on inputs into the graphical user interface and the results of the analysis and classification, the annotating includes identifying a location of the data source from which the data was imported. The data annotations related to the relationships and classification of all of the data in the database are stored in an annotation data structure. The data in the database is accessed by referencing the annotation data structure through inputs into the graphical user interface on the display device. The requested data and related data are presented simultaneously in a plurality of windows on a display device wherein the plurality of windows simultaneously present the requested data and related data in a variety of views based on the annotations stored in the annotation data structure.

Embodiments of the present invention disclose a system for managing data from data sources in collaboration. The system includes a database, a display device for presenting data and a graphical user interface, and a server. The data stored on the database may be retrieved from a plurality of data sources. The display device presents a graphical user interface. The server is configured to access the plurality of data sources in response to a request input to the graphical user interface, and includes a processor that executes computer program instructions. The processor is configured to execute program instructions that cause the processor to perform the functions of: importing data from at least one of the plurality of data sources; identifying the location of the data source from which the data was imported; classifying the imported data and catalog relationships between the imported data and preexisting data in the database; storing the results of the classifying and cataloging in a data structure; processing inputs from the graphical user interface to access the data from at least one of the plurality of data sources; and presenting data according to the processed inputs on the display device.

Embodiments of the present invention disclose a computer readable medium embodied with program instructions for collaboratively modifying data for presentation in a multiple user environment and for storage. The program instructions cause a computer to execute the following steps. Data is imported from a new data source into a database. The new data is analyzed for relationships to other data in the database. The new data is also classified according to a classification data structure. The new data and the other data is annotated based on the results of the analysis and classification, the annotating includes identifying a location of the data source. The data annotations related to the relationships and classification of all of the data in the database are stored in an annotation data structure. The data in the database is accessed by referencing the annotation data structure. The requested data and related data are presented in a plurality of windows on a display device wherein the plurality of windows present the requested data and related data in a variety of views based on the annotations stored in the annotation data structure.

Figure 1:
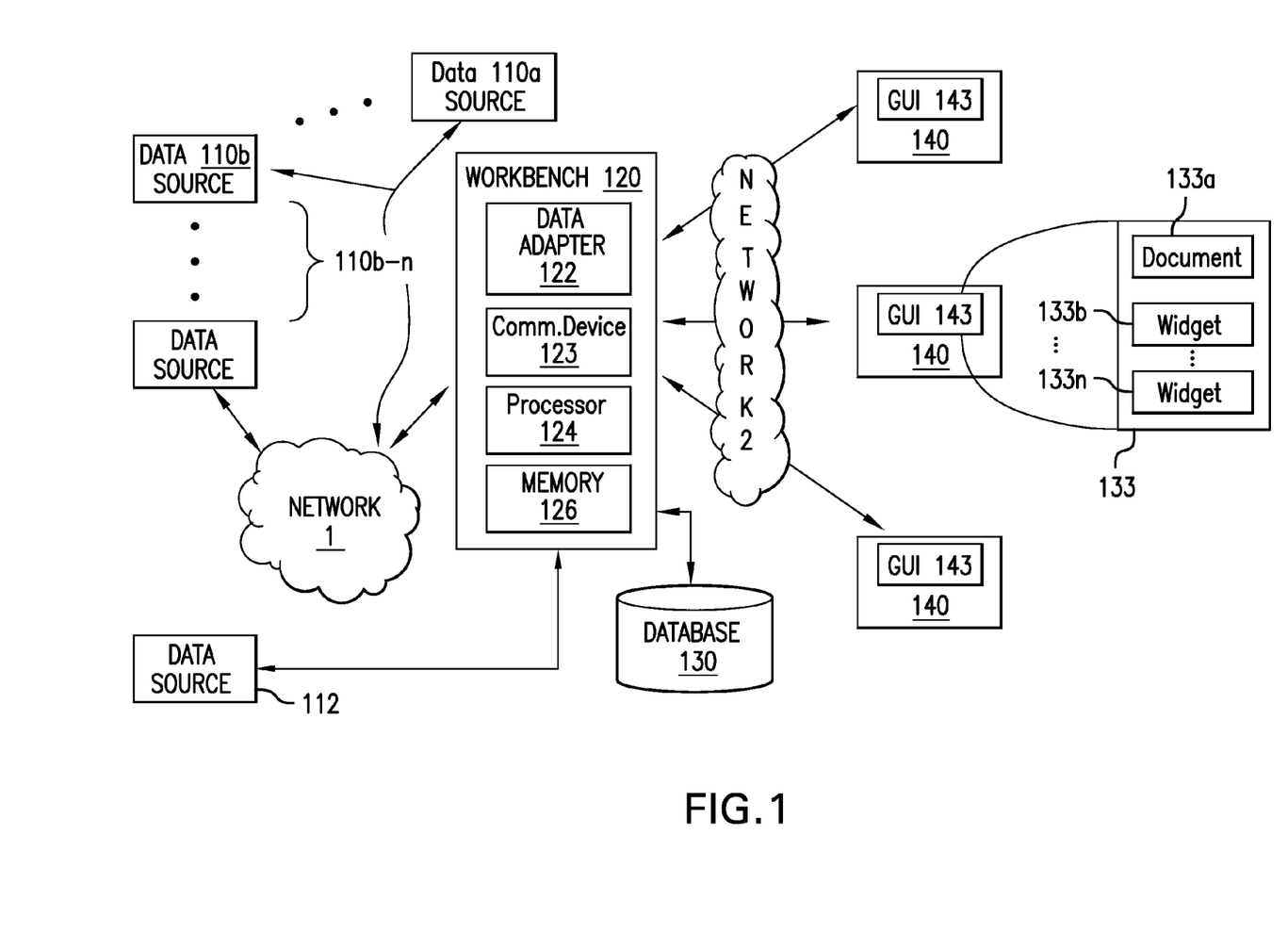
FIG. 1 illustrates an exemplary system architecture according to an embodiment of the present invention.

FIG. 1 shows an exemplary system architecture. The exemplary system may comprise a plurality of data sources 110*a*-110*n*, an internal data source(s) 112, a server 120, a data storage device 130, and a plurality of clients 140. The data storage 130 may store a semantic graph representation of the data.

The plurality of data sources 110*a*-110*n* can be databases, web pages or similar sources of electronic data. The plurality of clients 140 can be coupled to the server 120, also referred to as a collaborative workbench, via a computer network 2, such as an intranet, local area network (wireless or wired), wide area network (wireless or wired) or similar types of networks, while data sources 110*a*-110*n* are accessible by the plurality of clients 140 and collaborative workbench 120 via a computer network 1, e.g., the Internet, by the collaborative workbench 120. Alternatively, internal data sources 112 may be data sources maintained on another server, such as an image server or other type of database server, that may be connected directly to the workbench 120.

The plurality of clients 140 may be any of a personal computer, a handheld personal digital assistant ("PDA"), or any other type of microprocessor-based device. Each client 140 may include a processor, input device, output device, storage device, client software and communication device for communicating over the networks 1 and 2. The input device may include a keyboard, mouse, pen-operated touch screen, voice-recognition device, graphical user interface or any other device that provides input from a user, and the output device may include a monitor, printer, disk drive, speakers, or any other device that provides output to user.

The collaborative workbench 120 may comprise a data adapter 122, a processor 124, a communication device 123 and a memory 126. The data adapter 122 may be used for retrieving data from data storage locations via a computer network 1 or computer network 2 by generating data requests in a format suitable for the specific data storage location from which data is being retrieved.

The data storage device 130 may contain imported data which may automatically be reloaded from time to time, for example, at regular intervals or when a data change is detected or according to some other conditions, user annotations and user edits as well as configuration data on how data, which is typically based on configuration data for a certain graph node, should be visualized and how a certain data source 110a-110n should be accessed. The data storage 130 may contain all the information that is required for the data management process. Of course, this information may be distributed between a plurality of data stores or even partially maintained on a client 140. In order to accommodate data from any source, the data model may be a directed labeled graph which is represented as a set of tuples (s, p, o), which stand for subject, predicate, and object, respectively. For example, "London (s) isCapitalOf (p) UK (o)". Along with each tuple, the creation time of the statement t, the creator c and the data source m are also stored for an additional level of detail that may be used in maintaining the currency of the data. Continuing the example, by augmenting the statement with time t (when was the statement made), creator c (who said it) and model m (which datasource does it come from). We can state: on Oct $30^{th}$ (t), Joe (c) stated on his homepage (m) that London (s) is the capital (p) of the UK(o). Of course, other data models may be used. Alternatively, or in addition to, all or a portion of the may be stored in memory 126.

Thus, the structure of the stored data may be a set of 6-tuples (s,p,o,t,c,m). In some of the following examples, we limit the discussion to referring to the 3-tuples (s,p,o) since t,c,m are not relevant for understanding the examples. Every member of the 6-tuple may itself be a node in a graph. Thus, it is possible to go from a statement to its creator and find out statements about the creator. The data storage offers an application program interface (API) for querying and updating the tuples. The data storage also ensures scalable access by users to the data as well as its persistence on a non-volatile storage medium. The data storage may also provide access rights that restrict the set of users that is allowed to read and write a specific tuple or even specific data. The access rights themselves may be stored as tuples with a special predicate which is recognized by the data storage engine. The data storage can provide a type system by representing type information as another 6-tuple. A special predicate may be user defined or may be defined by the software application designer.

A simple implementation might look as follows:

```
class Tuple(s,p,o,t,c,m)
class Store{
    Tuple[ ] data
    void create(string user, Tuple t) { if hasRight(user, create,
    t.prediacte) add t }
```

-continued

```
    void read(string user, Tuple t) { if hasRight(user, read,
    t.prediacte) read t }
    void update(string user, Tuple t, delta) { if hasRight(user, update,
    t.prediacte) update t }
    void delete(string user, Tuple t) { if hasRight(user, delete,
    t.prediacte) delete t }
    Tuple[ ] query(s,p,o,t,c,m) { search data }
    boolean hasRight(string user, string operation, string predicate) {
        return (query(user, operation, predicate, ?, ?, ?) is not empty)
    }
}
```

By using the tuples, the data can be configured for visualization by the client 140. The data visualization is configured according to specialized statements having the graph node or the graph node's classification type as their subject. For instance, continuing with the previous examples, using several statements it can be stated that London is a city and that cities are visualized using a satellite imagery map using the city's latitude and longitude. However, an exception may be made for a specific city, for example, Munich, in which case, Munich may be visualized using a street map instead of the default satellite imagery map used for other cities.

The data storage device 130 and/or memory 126 may include volatile and nonvolatile data storage, including one or more electrical, magnetic or optical memories such as a RAM, cache, hard drive, CD-ROM drive, a RAID device, a tape drive or a removable storage disk.

The communication links between the clients 140, the server 120, network 1, network 2, internal data source(s) 112, and data sources 110a-110n may include telephone lines, DSL, cable networks, T1 or T3 lines, wireless network connections, or any other arrangement that provides a medium for the transmission and reception of computer network signals. Computer networks 1 and 2 may include any type of packet-based network, such as a wide-area network ("WAN") (e.g., the Internet) and/or a local-area network ("LAN") (e.g., an intranet or extranet). Computer networks 1 and 2 may implement any number of communications protocols, including TCP/IP (Transmission Control Protocol/Internet Protocol).

The operation of the workbench will now be described in more detail with continued reference to FIG. 1. In FIG. 1, the workbench 120 interacts with data storage 130 through a data adapter 522 that is also capable of retrieving data from data sources 110 and 112. In order to access data sources 110 and 112, a minimum amount of information may be used by the data adapter 122:

location address of the data source (e.g. a URL);
an operation to invoke in order to obtain the data (e.g. a SQL command); and
credentials for accessing the source (e.g. a certificate or user and password).

This information is obtained by the data adapter 122 from the data storage 130. The data adapter 122 retrieves association information related including the data source address from the data storage 130 by querying the data storage 530 for a given type of data. The data adapter 122 using this information accesses the data source to retrieve the requested data. For example, assume you have two nodes: datasource 110a and datasource 110b. Both are of type "SQLDataSource". Then, the data adapter 122 may use a SQLDataSource adapter to query both datasources. Similarly, during visualization of the data, the widgets, such as "Satellite Imagery Widget", may use the type information to visualize both London and New York in the same manner because both London and New York are of type "city". Note that nodes can have many types. For example, London might have the types: city, capital, travelDestination, and the like.

Example: our datasource might tell us (datasource 110*a*, type, SQLDataSource), (datasource1, user, Joe) and (datasource 110*a*, ipAddress, 1.2.3.4). With this information, we call the adapter SQLDataSource.load (joe, 1.2.3.4). In response, we get a table back which is converted to triples and inserted into the database again.

After the raw data is obtained from the data source 110*a*, 110*b*, the data adapter 122 converts or maps the raw data to be output into a format comprising the 6-tuples which are then stored in the central data storage 130. The mapping of raw data then may depend on both syntax (e.g. ASCII, XML, CSV, etc.) and the semantics of the output. The mapping can be configured by associating terms and relations of the datasource to terms and relations of the data storage. For instance, the terms George Bush Jr. and George W. Bush might be defined as being equivalent. Similarly, the English language relation "is president of" and its German counterpart "ist präsident von" might be defined as being equivalent. The data storage contains information about the datasources in the form of 6-tuples. This includes information on how to access the datasource as well as on how to map the raw data obtained from the datasource. Example: (datasource 110*a*, ipAddress, 1.2.3.4) and (isPresidentOf, sameAs, istPräsidentVon)

The rationale behind this is to apply the same tools and collaborative teamwork to both the data that has been converted or mapped and stored in the central data storage 130. In other words, the integrated data as well as the data supporting the process of the integration itself can be operated on by each client 140 using the workbench 120 regardless of the client 140 location.

A simple implementation for accessing and loading the data may be implemented as follows:

```
function loadData( ) {
    query data storage for all adapter configurations
    for each configuration c {
        prepare query using c
        load raw data
        convert raw data to graph
        delete previous results from store
        insert new results into store
    }
}
function convertTableToGraph {
    determine table primary key
    generate unique graph node term S from (composite) primary key
    for every table column C {
        for every row R {
            add (S,label of C,data of R,C) to result
        }
    }
}
function convertXMLtoGraph {
    determine primary key locations in the tree
    map primary keys to a tree node
    for each node S {
        for each child node C {
            add (PK mapped to S, C node label, C text value) to result
        }
    }
}
...
```

Each of the clients 140 connected to the workbench 120 may have a graphical user interface 143. The requested data from the data store 130 is presented or visualized on a client 140 via the graphical user interface 143 according to the tuple stored with the data. The visualized data on display device 133 may be any data retrieved from the data storage 130 that satisfies the request, which as illustrated both a document 133*a* with natural language descriptions page as well as a number of widgets 133*b*-133*n* are displayed together. Of course, the visualized data on display device 133 can comprise any number of documents 133*a* or none, any number of widgets 133*a*-133*n*, or none, or any combination of both documents 133*a* and widgets 133*a*-133*n* that satisfy provide the requested data. Every graph node of the data visualization is implicitly also a document. In order to properly display, the user interface 143 obtains some or all of the following information:

The document associated with the current node of the graphical visualization;

The names of the displayed widgets associated with the current node; and

Any additional configuration parameters that specify how the widget displays information.

Given a document's address, the system derives the identity of a graph node. The data storage 130 is queried and the information above is retrieved. Finally, the document 133*a* and widgets 133*b*-133*n* are rendered. In order to associate document 133*a* text with the underlying data, queries can be embedded in the document 133*a* text. For instance, the text in the document 133*a* may be about a city could provide a list of neighboring cities by specifying a query such as (?context hasNeighborCity ?x) in order to always receive up-to-date data rather than replicating the data in text and having to update it all the time. It is preferable to use a syntax (such as a semantic wiki syntax as is known in the art) that allows adding labeled hyperlinks, but data can also be entered via text.

The graphical user interface 143 may display the graph edges as hyperlinks on the display device. Widgets 133*b*-133*n* may also allow users to edit edges of the graphic visualization, delete them or create new ones. The edges being the intersection of a document 133*a* with a widget 133*b*-133*n* or with another document 133*a* or vice versa. Additional information, such as explanations about terms and relationships can be documented in free text using the corresponding document. The document 133*a* of a given node is stored by the system using a predefined relationship. As a client 140 traverses from one node of the graphic visualization to another, the document 133*a* or widgets 133*b*-133*n* associated with the graphical node can change to present different data or data in another format depending upon the associated document 133*a* or widget 133*b*-133*n*.

New information may be stored only in the data storage 130. Deletions or edits to existing data are applied to the data storage 130 and can also be forwarded to the data source 110*a*-110*n* that provided the information. This can be accomplished, since every 6-tuple links back to its respective data source 110*a*-110*n*. Using the same mechanism that configures access to the data source 110*a*-110*n*, create, update, and delete operations can also be specified for the respective data source 110*a*-110*n*. If these descriptions are present, the changes made on the graphical user interface 143 can be applied to the data source 110*a*-110*n* as well.

If the data source 110*a*-110*n* does not support such operations or if the system has no write privileges for it, the data adapter 122 may cause the edits and/or deletions to be stored, and may apply edits and/or deletions to the data source's 110*a*-110*n* triple-tuple set each time the data source 110*a*-110*n* is required.

A simple implementation might look as follows:

```
function render {
    obtain current context C
    query store for all triples that
        have C as a subject
        have C as a predicate
        have C as an object
    display C's graph environment
    query( C, document, X, ?,?,? )
    display document X
    query( C, hasWidget, X, ?,?,? )
    for each widget X {
        query configuration conf for widget X
        display widget X(conf)
    }
}
```

Figure 2:
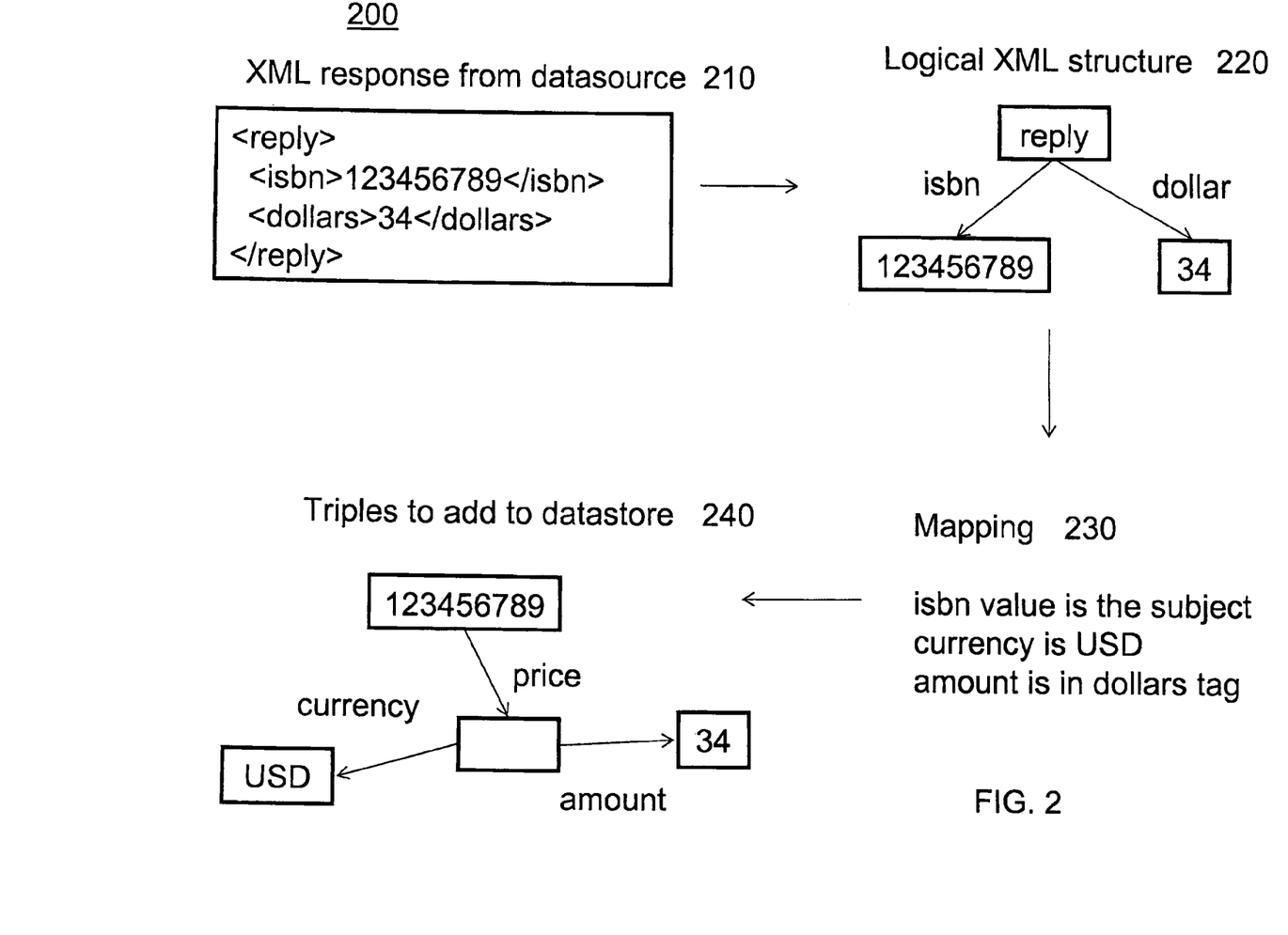
FIG. 2 illustrates an exemplary logical data mapping to an embodiment of the present invention.

FIG. 2 illustrates an exemplary mapping of data according to an embodiment of the present invention. The steps shown in FIG. 2 are an exemplary process for structuring the tuples. Of course, other methods can be used.

The process 200 is the conversion of data from a data source to a tuples data structure. Data, such an ISBN number of a book and the price of the book in dollars, is retrieved from a data source in XML format (210). The XML data has a logical structure as shown in 220. The logical structure 220 is mapped into a semantic form (230) for understanding by a human user. The semantic form 230 is further mapped to a tuple related to price 240. The data related to the data "price" will be an ISBN, an amount, and the type of currency. The "price" may be linked in the database to other data, such "title" or "author", which may be linked to any of the tuples, ISBN, amount or currency.

Figure 3:
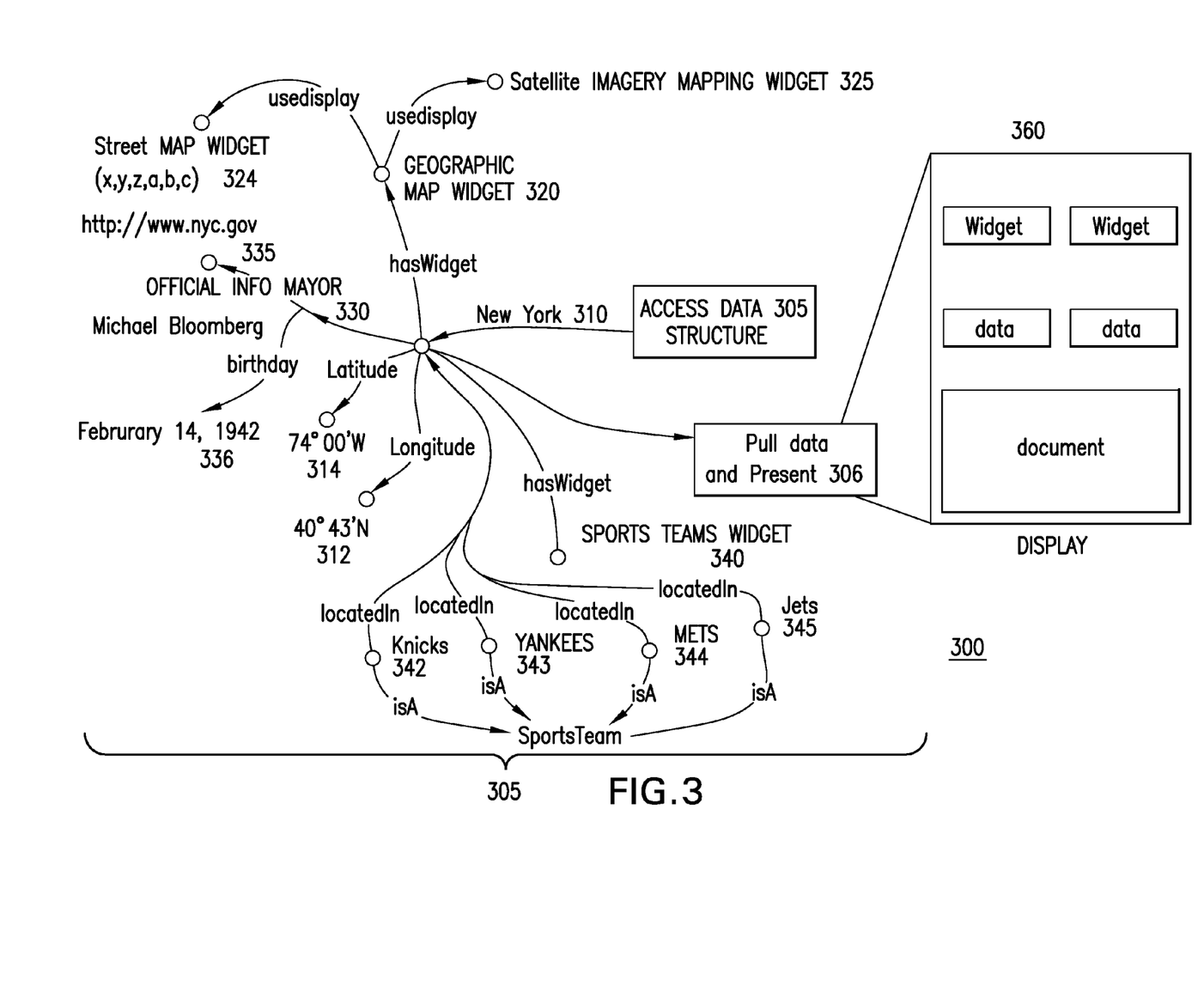
FIG. 3 illustrates an exemplary data labeled graph according to an embodiment of the present invention.

An exemplary graphical node configuration will be described with reference to FIG. 3. The graph node structure 305 may comprise a plurality of nodes that are interconnected and associated with one another as described above. For example, node 310 may be associated with New York City. Location nodes 314 and 312 may provide the latitude and longitude, respectively, of New York City. A geographic mapping widget may be associated with node 320 and have widgets, street map display type 324, and satellite imagery display type 325 associated to it. Either widget 324 or 325 may use location nodes 314 and 312 to access street map data or satellite imagery data for New York City, when a map of New York City is requested by a user of workbench 120. Likewise, mayor node 330 represents Michael Bloomberg and is associated with New York City node 310, and additional mayoral information, such the mayor's birthday or other personal information 336 and official information 335, such the City website, may also be associated with the mayor node 330. Also, a sports team widget 340 may be associated with the New York City node 310. The sports team widget 340 can visualize sports teams specific to New York City to the New York City node 310. Of course, the associations of different types data sources having data related to New York City can continue. This graphical node data structure can be stored in a database accessible by the workbench.

Each of the different associations can be used when a user requests data regarding New York City. Via a request for data, a data adapter in the workbench may formulate a query to access the data structure 305. Once authorized to access the data structure, the requested data will be pulled and presented on display 360.

Figure 4:
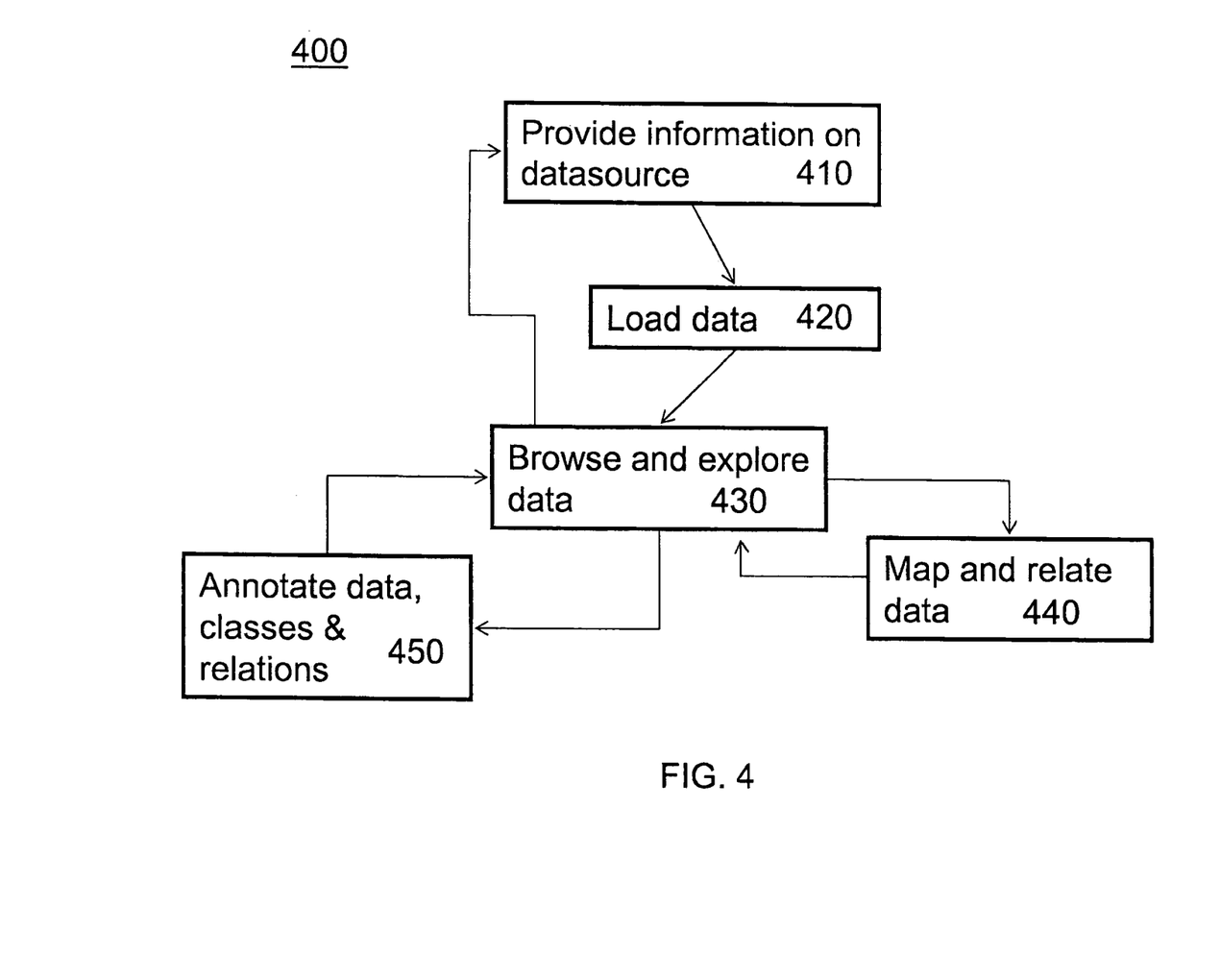
FIG. 4 illustrates an exemplary process of data importation and annotation according to an embodiment of the present invention.

FIG. 4 illustrates an exemplary workflow for a user of the system. In the workflow 400, a user can identify a new data source from a plurality of data sources. Initially, a single data source may be defined, which includes providing information regarding the new data source (Step 410). The defining information may include a uniform resource locator (URL) of the data source, the name of the data source, how often the data source is updated, the date of the latest update, the owner of the data source, indicators as to the reliability of the data, and the like.

Once the information has been provided on the new data source, the data from the new data source is loaded (Step 420). The data is acted upon by a user by browsing and exploring the data (Step 430). At step 440, the data is converted into a graph representation and visualized as a set of linked documents in a graphical user interface. The user, by interacting with the visualized data in the graphical user interface, can again browse the documents or other data formats from the new data source (Step 430) in the visualized set of linked documents through controls in the graphical user interface. The user, at step 450, can choose to annotate the data, such as revising (adding, deleting, modifying) terms in documents, classify the data, and relationships in the documents of other formats via controls in the graphical user interface. For instance, a user may look at the page for New York and find that it has not yet been classified as a city. The user can add this information right on the page through manipulation of controls in the graphical interface. Similarly, a user may be on a page describing an "isPresidentOf" relation, i.e. what it means to be president of something. On that page, The user can establish the possibly missing link to the "istPräsidentVon" relation stating that the two, the "isPresidentOf" relation and the "istPräsidentVon" relation, have the same meaning. If there are pre-existing data sources in the system, the new data source may contain data related to a pre-existing data source or be relevant to data in the pre-existing. Once the data source is added, the user might map a relationship R1 used in the new data source to relationship R2 used in the pre-existing data source D2. Thereby establishing a link between the two relationships, R1 and R2. Alternatively, a user may also define terms to be equivalent, such as "President" and "Commander in Chief." In which case, a data source describing the "White House" may be mapped to a data source describing the "Commander in Chief" of U.S. Armed Forces. The relationships, such as R1 and R2, can be between terms of the data set in each of the new and pre-existing data sources, classification of the data, or any other attributes of the new and pre-existing data sources.

Figure 5:
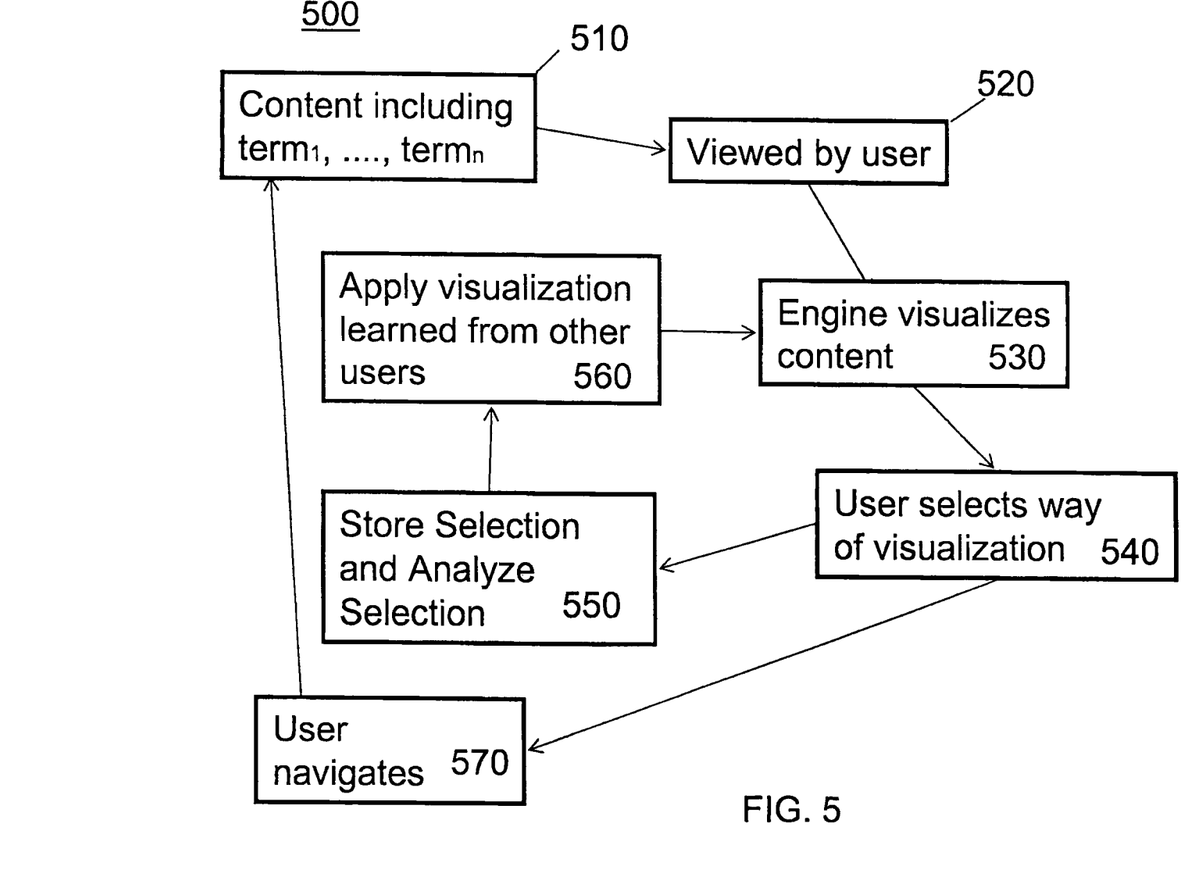
FIG. 5 illustrates an exemplary process of analyzing data usage and modification of data presentation according to another embodiment of the present invention.

FIG. 5 shows the method of collecting user choices for customizing the visualization of terms and data. This process 500 learns from a large body of users and suggests preferred choices for other users, thereby integrating collective intelligence. Collective learning 500 can occur when content including a given a term (510) is viewed by a user 520, the user can select suitable visualization widgets (530). The user selects a particular way of configuring the widget to visualize the data (540), for example, a movie rating visualization for the term "George Clooney". The system may store the selections of all users accumulating statistics regarding the alterations made by the user with existing statistics of prior users who viewed the same data or the specific data views selected by a user; the system can analyze the statistics and make determinations regarding how a majority of users would choose to visualize the data (550). Based on a certain visualization selected for a given class of term by a majority of users, the system automatically suggests the certain visualization for other users (560). Or, alternatively, automatically alters the presentation of the requested data according to the analysis of the stored statistics.

Note that visualizations can include forms or controls that allow a user to perform a certain operation. For instance, the movie rating display might also invite the user to rate a movie or actor himself/herself or the forms may include areas for personalization of presentation or obtain and process information specific to the user.

Alternatively, the user may navigate (570) to a particular data source and select content including a plurality of terms (510).

This method for assembling page content is especially suitable for web based forms of visualization, where content from different sources is viewed by many users and content can be seamlessly displayed in a web browser.

A simple implementation of the process 500 may be implemented as follows:

```
function changeWidgetSelection {
    // user U choses widget W for visualizing term T
    pick anonymous node X
    save tuple (U, choosesVisualization, X)
    save tuple (X, onTerm, T)
    save tuple (U, withWidget, W)
}
function pickPopularWidget {
    // user U looks at term T
    query (otherUser,choosesVisualization, X)
    query (X, onTerm, T)
    query (X, withWidget, W)
    score = 0
    for all matches of W {
        for all matches of userUser {
            increment score with a measure of similarity(U, otherUser)
        }
        if score over threshold
            suggest widget W
    }
}
```

Specific applications of the exemplary system are also envisioned. For example, the described embodiments may be applicable to disaster response. Rescue vehicles may be installed with vehicle identifiers, GPS locator beacons, real-time video transmission capabilities and other types of sensors and transmitters. The vehicle identification, GPS location and video and other data can be transmitted to a number of receivers and stored on a number of data storage devices. The disclosed workbench can be configured to access and/or receive data real-time from the receivers and/or the number of data storage devices, and to access other data sources such weather, traffic and map sites. By accessing the differing data sites, the workbench is able to integrate weather and traffic information with the data from the vehicles map and vehicle location information from GPS and navigation systems in the rescue vehicles. The integrated data can be used by the respective rescue teams to synchronize their efforts, get warnings about adverse traffic and weather in the respective target areas and the like. The real-time video can also provide controllers of the rescue vehicles with a real time indication of whether additional rescue teams are necessary or other types of rescue personnel, e.g., hazardous materials, are needed to assist the responders at the scene. The workbench may also facilitate documentation of the event for public and private record purposes. For example, in a police traffic stop, a controller personnel may have the police car location in GPS locations, overlaid on either a street map or satellite map, while being presented with real-time video of the vehicle being stopped. The controller personnel can also associate a police report document with the traffic stop and input data as the police officer receives information from the offending motorist, for example.

In the bio-medicine domain, several data sources may maintain information on the human genome, the way various human and animal enzymes react, and other relevant bio-medicine information. These databases may established by collecting results from various experiments on humans and animals and storing the resulting data. The system can integrate and visualize these data sources and help scientists in planning and documenting research by presenting a number of data results in a variety of graphical and real image presentations on a single display. A user may annotate the data based on observations and correlations observed from the presentation of the various data.

In a radio frequency identification (RFID) application, the exemplary system may be configured to integrate data from a package tracking system and RFID sensors that locate packets on various transportation belts. The data visualization may show congestion hot-spots and the overall system throughput of the package delivery system. A controller can note errors in package identification by immediately cross referencing the delivery company's delivery address for a package compared to the delivery address provided by the customer. In addition, for a particular package, modifications to delivery address or other identifiers can be made while viewing the congestion hot-spots as well as the individual package data.

In an ambient environment computing application, the exemplary system may be configured to integrate data from a person's calendar, temperature and humidity sensors in the house, the person's heart rate monitor and the person's blood pressure data from a human wearable computer. The visualization of the data may be accessible for that person by the person, a doctor or other healthcare professional, or emergency response personnel. Specialized data display components might trigger alerts when certain conditions are met. The graphical user interface can provide a complete visual and audio presentation of a person's home environmental status, a person's vital statistics and/or location within the person's home.

Embodiments of the present invention can be implemented over a variety of different computing environments, for example, the Internet, a company Intranet, local area network (LAN), wide-access area network (WAN), a hardwired connection, a computer readable medium such as a DVD, CDROM, disk, RAM, ROM and/or flash memory, to provide the functionality described above and as recited in the claims.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method implemented by a computer comprising a processor, a graphical user interface, and a display device, the computer in communication with a database, the method for collaboratively modifying data for presentation in a multiple user environment, comprising:
    importing, by the processor, data from a data source into a database;
    responsive to the importation:
        automatically identifying, by the processor, a correspondence between the imported data and existing data in the database based on relationships identified in the imported data and relationships identified in the existing data, the correspondence identification including classifying at least a portion of the imported data according to a classification data structure that classifies relationships into classification types; and automatically annotating, by the processor, metadata of the imported data to identify at least one of the data source and a creator of the imported data;

receiving, by the processor and via a user interface, user input of annotations specifying relationships between the identified relationships; and responsive to user input requesting data:

accessing, by the processor, a subset of the data stored in the database by referencing the identified relationships, the automatically generated annotations, and the user-input annotations; and outputting, by the processor, the accessed data, wherein the outputting includes displaying at least a portion of the accessed data according to a view that is based on the classification.

2. The method of claim 1, wherein:

a first user identifies a first classification type of the classification data structure and a first one of the relationships identified in the existing data; and a second user modifies the first classification type or the first relationship to a second classification type or a second relationship.

3. The method of claim 1, further comprising:

configuring a server connected to the database to access the data source for retrieval of updated data in response to a data request.

4. The method of claim 3, wherein the configuring further comprises:

maintaining a list of locations of data sources for accessing data sources containing requested data; and updating the data stored in the database when a request for the data is received.

5. The method of claim 1, wherein the outputting includes displaying the accessed data in a first view as documents with widgets presenting related data in views having alternative presentation formats based on the respective classifications and relationships of different data elements of the accessed data.

6. The method of claim 5, further comprising:

accumulating statistics regarding alterations made by a plurality of users who viewed the same data, wherein the displaying is in a format selected based on the statistics.

7. The method of claim 5, wherein the displaying includes manipulating a graphical visualization scheme comprising nodes.

8. A system for managing data from data sources in collaboration, comprising:

a database for storing data retrieved from a plurality of data sources;

a display device for presenting a graphical user interface; and a server configured to access the plurality of data sources, the server comprising a processor that executes computer program instructions, the computer program instructions causing the processor to:

import data from a data source into the database;

automatically identify a correspondence between the imported data and existing data in the database based on relationships identified in the imported data and relationships identified in the existing data, the correspondence identification including classifying at least a portion of the imported data according to a classification data structure that classifies relationships into classification types;

automatically annotate metadata of the imported data to identify at least one of the data source and a creator of the imported data;

receive user input of annotations specifying relationships between the identified relationships; and responsive to user input requesting data:

access a subset of the data stored in the database by referencing the identified relationships, the automatically generated annotations, and the user-input annotations; and output the accessed data, including display of at least a portion of the accessed data according to a view that is based on the classification.

9. A non-transitory computer readable medium having stored thereon program instructions executable by a processor, the instructions which, when executed by the processor, cause the processor to perform a method for collaboratively modifying data in a multiple user environment, the method comprising:

importing data from a data source into a database;

automatically identifying a correspondence between the imported data and existing data in the database based on relationships identified in the imported data and relationships identified in the existing data, the correspondence identification including classifying at least a portion of the imported data according to a classification data structure that classifies relationships into classification types;

automatically annotating metadata of the imported data to identify at least one of the data source and a creator of the imported data;

receiving user input of annotations specifying relationships between the identified relationships; and responsive to user input requesting data:

accessing a subset of the data stored in the database by referencing the identified relationships, the automatically generated annotations, and the user-input annotations; and outputting the accessed data, wherein the outputting includes displaying at least a portion of the accessed data according to a view that is based on the classification.

10. The computer readable medium of claim 9, wherein:

a first user identifies a first classification type of the classification data structure and a first one of the relationships identified in the existing data; and a second user updates at least one of (a) the first classification type to a second classification type, and (b) the first relationship to a second relationship.

11. The computer readable medium of claim 8, wherein the method further comprises:

configuring a server connected to the database to access the data source for retrieval of updated data in response to a data request.

12. The computer readable medium of claim 11, wherein the configuring further comprises:

maintaining a list of locations of data sources for accessing data sources containing requested data; and updating the data stored in the database when a request for the data is received.

13. The computer readable medium of claim 9, wherein the outputting includes displaying the accessed data as documents with widgets presenting related data in views having alternative presentation formats according to the respective classifications and relationships of different data elements of the accessed data.

14. The computer readable medium of claim 13, wherein the method further comprises:

accumulating statistics regarding alterations made by a plurality of users who viewed the same data, wherein the displaying is in a format selected based on the statistics.

15. The computer readable medium of claim 13, wherein the displaying includes manipulating a graphical visualization scheme comprising nodes.

16. A computer-implemented method comprising:

importing, by the processor, from a data source, and into a database, data previously published at the data source and metadata associated with the data;

responsive to the importation:

automatically annotating, by the processor, the metadata of the imported data to add to the imported data an identification of at least one of the data source and a creator of the imported data; and automatically identifying, by the processor, a correspondence between the imported data and existing data in the database based on relationships identified in the imported data and relationships identified in the existing data, the correspondence identification including classifying at least a portion of the imported data according to a classification data structure that classifies relationships into classification types; and responsive to user input requesting data, obtaining a subset of the data stored in the database referencing the identified relationships, the automatically generated annotations, and the annotations; and outputting, by the processor and in a view that is based on at least one of the classification types, the subset of the data of the database.

17. A computer-implemented method comprising:

storing in a database data and a plurality of relationships that identify how different data elements of the data relate to each other;

receiving, by a computer processor, user-input of an annotation specifying a relationship between different ones of the plurality of relationships;

automatically identifying, by the processor, a correspondence between the imported data and existing data in the database based on relationships identified in the imported data and relationships identified in the existing data, the correspondence identification including classifying at least a portion of the imported data according to a classification data structure that classifies relationships into classification types; and automatically annotating, by the processor, metadata of the imported data to identify at least one of the data source and a creator of the imported data; and responsive to a data query:

obtaining, by the processor, a subset of the data stored in the database based on the plurality of the identified relationships, the automatically generated annotations, and based on the user-input annotation; and outputting, by the processor and in a view that is based on at least one of the classification types, the subset of the data.

18. The method of claim 1, wherein:

the imported data includes a first data element associated with a first element of the metadata of the imported data, a second data element associated with a second element of the metadata of the imported data, and a third data element associated with a third element of the metadata of the imported data, the third element of the metadata of the imported data identifying the third data element as defining a first relationship between the first and second data elements;

the existing data includes a fourth data element associated with a first element of metadata of the existing data, a fifth data element associated with a second element of the metadata of the existing data, and a sixth data element associated with a third element of the metadata of the existing data, the third element of the metadata of the existing data identifying the sixth data element as defining a second relationship between the fourth and fifth data elements; and the identification of the correspondence is based on the third element of the metadata of the imported data and the third element of the metadata of the existing data.

19. The method of claim 18, wherein the identification of the correspondence includes identifying a correspondence of the third element of the metadata of the imported data to the third element of the metadata of the existing data.

20. The method of claim 19, wherein the identification of the correspondence includes identifying a correspondence between the first data element and the fourth data element based on the identified correspondence of the third element of the metadata of the imported data to the third element of the metadata of the existing data.

21. The method of claim 1, wherein:

the imported data includes a first data element associated with a first element of the metadata of the imported data, a second data element associated with a second element of the metadata of the imported data, and a third data element associated with a third element of the metadata of the imported data, the third element of the metadata of the imported data identifying the third data element as defining a first relationship between the first and second data elements;

the existing data includes a fourth data element associated with a first element of metadata of the existing data, a fifth data element associated with a second element of the metadata of the existing data, and a sixth data element associated with a third element of the metadata of the existing data, the third element of the metadata of the existing data identifying the sixth data element as defining a second relationship between the fourth and fifth data elements; and the user input annotations specifying relationships between the identified relationships includes an annotation identifying a relationship between the third data element of the metadata of the imported data and the third element of the metadata of the existing data.

* * * * *